United States Patent
Tiberi et al.

(10) Patent No.: US 9,345,090 B2
(45) Date of Patent: May 17, 2016

(54) LIGHTING SYSTEM AND METHOD FOR CONTROLLING A LIGHT INTENSITY AND A COLOR TEMPERATURE OF LIGHT IN A ROOM

(71) Applicant: KONINKLIJKE PHILIPS N.V., Eindhoven (NL)

(72) Inventors: Luca Tiberi, Eindhoven (NL); Bahaa Eddine Sarroukh, Eindhoven (NL); Andre Melon Barroso, Eindhoven (NL); Janneke Verhaegh, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/761,423

(22) PCT Filed: Jan. 2, 2014

(86) PCT No.: PCT/IB2014/058015
§ 371 (c)(1),
(2) Date: Jul. 16, 2015

(87) PCT Pub. No.: WO2014/111821
PCT Pub. Date: Jul. 24, 2014

(65) Prior Publication Data
US 2015/0359069 A1 Dec. 10, 2015

Related U.S. Application Data

(60) Provisional application No. 61/753,987, filed on Jan. 18, 2013.

(30) Foreign Application Priority Data

Jan. 23, 2013 (EP) .................................. 13152322

(51) Int. Cl.
H05B 37/02 (2006.01)
H05B 33/08 (2006.01)

(52) U.S. Cl.
CPC ........ *H05B 33/0845* (2013.01); *H05B 33/0857* (2013.01); *H05B 37/02* (2013.01); *H05B 37/0218* (2013.01); *Y02B 20/46* (2013.01)

(58) Field of Classification Search
CPC ........... H05B 33/0845; H05B 33/0857; H05B 37/02; H05B 37/0218; Y02B 20/46
USPC .................................. 315/151, 294, 297, 308
See application file for complete search history.

(56) References Cited

U.S. PATENT DOCUMENTS 5,721,471 A 2/1998 Begemann
6,528,954 B1 3/2003 Lys
(Continued)

FOREIGN PATENT DOCUMENTS

GB 2306636 A 5/1997
KR 2010041894 A 4/2010
(Continued)

*Primary Examiner* — Daniel D Chang
(74) *Attorney, Agent, or Firm* — Meenakshy Chakravorty

(57) ABSTRACT

The present invention relates to a lighting system (10) arranged to control a light intensity and a color temperature of light in a room (1). The lighting system comprising: a light source (12) arranged to emit light, the light source (12) comprising a first and second light emitters (13, 14) each being adjustable between a number of light intensity levels and arranged to emit light having a first and second color temperature, respectively. The light source (12) is arranged to provide an output signal (OS) comprising information pertaining to a light intensity level of said first and second light emitters (13, 14), respectively; a light sensor (16) arranged to measure the light intensity and the color temperature of the light in the room, and to provide a sense signal (SS) comprising information pertaining to the measured light intensity and color temperature; and a controller (18) arranged to control the color temperature and the light intensity of the light in the room (1) by adjusting the light intensity level of said first and second light emitters (13, 14), based on said sense signal (SS) provided by the light sensor (16) and said output signal (OS) provided by the light source (12).

9 Claims, 6 Drawing Sheets

(56) References Cited

U.S. PATENT DOCUMENTS

| | | |
|---|---|---|
| 2006/0049332 A1 | 3/2006 | Vornsand |
| 2009/0121641 A1 | 5/2009 | Shih |
| 2010/0259197 A1 | 10/2010 | Ribas |
| 2011/0018465 A1* | 1/2011 | Ashdown ........... H05B 33/0818 315/294 |
| 2011/0309754 A1* | 12/2011 | Ashdown ........... H05B 33/0869 315/151 |
| 2014/0055041 A1* | 2/2014 | Ramer ............... H05B 37/0209 315/153 |

FOREIGN PATENT DOCUMENTS

| | | |
|---|---|---|
| WO | 2009044330 A1 | 4/2009 |
| WO | 2009093191 A2 | 7/2009 |
| WO | 2011019241 A2 | 2/2011 |

* cited by examiner

LIGHTING SYSTEM AND METHOD FOR CONTROLLING A LIGHT INTENSITY AND A COLOR TEMPERATURE OF LIGHT IN A ROOM

CROSS-REFERENCE TO PRIOR APPLICATIONS

This application is the U.S. National Phase application under 35 U.S.C. §371 of International Application No. PCT/IB2014/058015, filed on Jan. 2, 2014, which claims the benefit of U.S. Provisional Patent Application No. 61/753,987 filed on Jan. 18, 2013 and European Patent Application No. 13152322.7, filed on Jan. 23, 2013. These applications are hereby incorporated by reference herein.

FIELD OF THE INVENTION

The present invention relates to a lighting system and a method for controlling a light intensity and a color temperature of light in a room, the light in the room originating from a light source of the lighting system and at least one more additional light source.

BACKGROUND OF THE INVENTION

Daylight harvesting is an energy saving solution for smart lighting systems which maintains a desired light intensity level in a room constant by dimming the artificial light as a function of the amount of daylight that enters the room from the windows. An efficient solution to deliver on this goal is the use of light sensors, which enable a feedback loop control of the lighting output of dimmable luminaries. However, this solution does not take into account other features of the lighting ambience, such as those concerning the spectral composition of the light, e.g. color temperature.

Color temperature is widely acknowledged as an important feature of the lighting scene as it is known to have effects on perception and on non-visual effects of lighting. As a matter of fact, variable color lighting is increasingly being used in applications where the ambience is crucial, such as museums, exhibitions etc., in working environments, such as offices, schools etc. to enhance performances (the so called "task related lighting"), as well as in any other application were the user experience can benefit from different ambiences. The effectiveness of the lighting system in controlling the ambient chromaticity is effected by the contribution of daylight to the overall lighting of the room.

In WO 2009/044330 a variable color lighting system is disclosed. The variable color lighting system comprises a light source, a controller for controlling the light source, and a light sensor. The light sensor is arranged for sensing spectral information comprising at least two different portions of a spectrum of light impinging on the light sensor. The controller is configured for receiving a sense signal and for generating a drive signal supplied to the light source to determine the spectrum of the light emitted by the light source in dependence on the spectral information from the light sensor. The effect of the measures is that the sensing of the spectral information of the light impinging on the light sensor enables the controller to adapt the color temperature of the light emitted by the light source such that the perceived color temperature more closely corresponds to an intended temperature. However, by adapting the color temperature of the light emitted by the light source such that the perceived color temperature more closely corresponds to an intended color temperature according to the method described in WO 2009/044330 the light intensity of the light in the room may be unintendinly altered.

SUMMARY OF THE INVENTION

It is an object of the present invention to provide a more precise control of the color temperature of the light in a room.

Moreover, it is an object of the present invention to provide a robust feedback control loop over color temperature in a variable color lighting system for setting a desired color temperature and for keeping the desired color temperature over time.

Furthermore, it is an object of the present invention to provide simultaneous control of both the color temperature and the light intensity of the light in a room.

According to a first aspect of the invention, this and other objects are achieved by a lighting system arranged to control a light intensity and a color temperature of light in a room. The lighting system comprises: a light source arranged to emit light, the light source comprising a first light emitter adjustable between a number of light intensity levels and arranged to emit light having a first color temperature, and a second light emitter adjustable between a number of light intensity levels and arranged to emit light having a second color temperature, wherein said second color temperature is different from said first color temperature, the light source is further arranged to provide an output signal comprising information pertaining to a light intensity level of said first and second light emitters, respectively; a light sensor arranged to measure the light intensity and the color temperature of the light in the room, the light in the room originating from both the light source and at least one more additional light source, and to provide a sense signal comprising information pertaining to the measured light intensity and color temperature; and a controller arranged to control the color temperature and the light intensity of the light in the room by adjusting the light intensity level of said first and second light emitters, based on said sense signal provided by the light sensor and said output signal provided by the light source; wherein the controller is further arranged to calibrate the lighting system by defining a correspondence between a number of light intensity levels of the first light emitter and a corresponding light intensity measured by the light sensor and a correspondence between a number of light intensity levels of the second light emitter and a corresponding light intensity measured by the light sensor, and to store these correspondences in a memory.

The above lighting system is suitable to be used in any application where contributions from an additional light source, e.g. daylight, are involved. Examples are applications were the ambience is crucial, such as museums, exhibitions etc., working environments, such as offices, schools etc. so as to enhance performances (the so called "task related lighting") etc. The lighting system provides the energy savings of a daylight harvesting system while allowing light intensity and color temperature as chosen by the user to be kept constant. By calibrating the lighting system by finding the correspondences between a number of light intensity levels of the first and second light emitters, respectively, and a light intensity measured by the light sensor it is possible to control the light system so that a desired light intensity and color temperature of the light is achieved. By using the light sensor being arranged to measure both the light intensity and the color temperature of the light in the room, and by calibrating the lighting system according to the above the lighting system can optimize the output of the light emitters in order to keep the color temperature and the light intensity of the light in the room as close as possible to the color temperature and the light intensity set by the user of the lighting system, independent on the contribution of additional light, e.g. daylight, in the room.

The first color temperature may be below 2 000 K and the second color temperature may be above 10 000 K. By using a first light emitter having a color temperature below 2 000 K and a second light emitter having a color temperature above 10 000 K the color temperature in the room may be altered to the maximum possible level.

The light sensor may be arranged to continuously measure the light intensity and the color temperature at a fixed sampling frequency. By measuring the light intensity and the color temperature at a fixed sampling frequency the lighting system may be continuously controlled.

The controller may further be arranged to set a desired light intensity and color temperature of the light in the room by: from the sensor receiving measured present light intensity and color temperature of light in the room; determining a contribution of light intensity and color temperature from the at least one more additional light source by subtracting a present contribution of light intensity and color temperature of the first and second light emitters, respectively, from the measured present light intensity and color temperature; determining new contributions of light intensity and color temperature for the first and second light emitters, respectively, such that the desired light intensity and color temperature of light in the room can be achieved; determining, based on the correspondences stored in the memory, new light intensity levels of the first and second light emitters corresponding to said new contributions of light intensity and color temperature; and setting the light intensity levels of the first and second light emitters to said new light intensity levels of the first and second light emitters. Hence, due to the calibration of the lighting system a simple and robust method for setting a desired light intensity and at the same time desired color temperature of the light in a room is made available.

The controller may further be arranged to control the color temperature of the light in the room by: from the sensor receiving measured present color temperature of light in the room; comparing the measured present color temperature with a predetermined color temperature; adjusting, in case of the measured present color temperature being below or above the predetermined color temperature, the light intensity level of the first light emitter with a predetermined amount; determining, based on the correspondences stored in the memory, a light intensity adjustment of the first light emitter corresponding to said adjusting of the light intensity level; determining a light intensity counter adjustment of the second light emitter such that the light intensity of the light source is preserved; and determining, based on the correspondences stored in the memory, a new light intensity level of the second light emitter corresponding to said light intensity counter adjustment. Hence, due to the calibration of the lighting system a simple and robust method for controlling a desired color temperature of the light in a room is made available.

The controller may further be arranged to control the light intensity of the light in the room by: from the sensor receiving measured present light intensity of light in the room; comparing the measured present light intensity with a predetermined light intensity; and adjusting, in case of the measured present light intensity being below or above the predetermined light intensity, the light intensity level of both the first and second light emitters such that the light intensity of light in the room corresponds to the predetermined light intensity.

Accordingly the above lighting system may provides the desired light outcome in terms of both light intensity and color temperature, independent of the amount of additional light, e.g. daylight, in the room. The lighting system sets the light intensity levels of different light emitters in order to compensate for the contribution from the additional light source not only as far as color temperature, but also as far as light intensity is concerned.

According to a second aspect of the invention a method for controlling a light intensity and color temperature of light in a room is provided. The method comprises: providing a lighting system comprising: a light source arranged to emit light, the light source comprising a first light emitter adjustable between a number of light intensity levels and arranged to emit light having a first color temperature, and a second light emitter adjustable between a number of light intensity levels and arranged to emit light having a second color temperature, wherein said second color temperature is different from said first color temperature; and a light sensor arranged to measure a light intensity and a color temperature; outputting, from the light source, an output signal comprising information pertaining to a light intensity level of said first and second light emitters, respectively; outputting, from the light sensor, a sense signal comprising information pertaining to the measured light intensity and color temperature; calibrating the lighting system by defining a correspondence between a number of light intensity levels of the first light emitter and a corresponding light intensity measured by the light sensor and a correspondence between a number of light intensity levels of the second light emitter and a corresponding light intensity measured by the light sensor and storing said correspondences in a memory; and controlling the light intensity and color temperature of the light in the room, the light in the room originating from both the light source and at least one more additional light source, by adjusting the light intensity level of said first and second light emitters, based on said sense signal provided by the light sensor and said output signal provided by the light source.

It is noted that the invention relates to all possible combinations of features recited in the claims.

BRIEF DESCRIPTION OF THE DRAWINGS

These and other aspects of the present invention will now be described in more detail, with reference to the appended drawing showing an embodiment of the invention.

FIG. 1 is purely diagrammatic and not drawn to scale. Particularly for clarity, some dimensions are exaggerated strongly.

DETAILED DESCRIPTION

The present invention will now be described more fully hereinafter with reference to the accompanying drawing, in which a currently preferred embodiment of the invention is shown. This invention may, however, be embodied in many different forms and should not be construed as limited to the embodiments set forth herein; rather, these embodiments are provided for thoroughness and completeness, and fully convey the scope of the invention to the skilled person.

Figure 1:
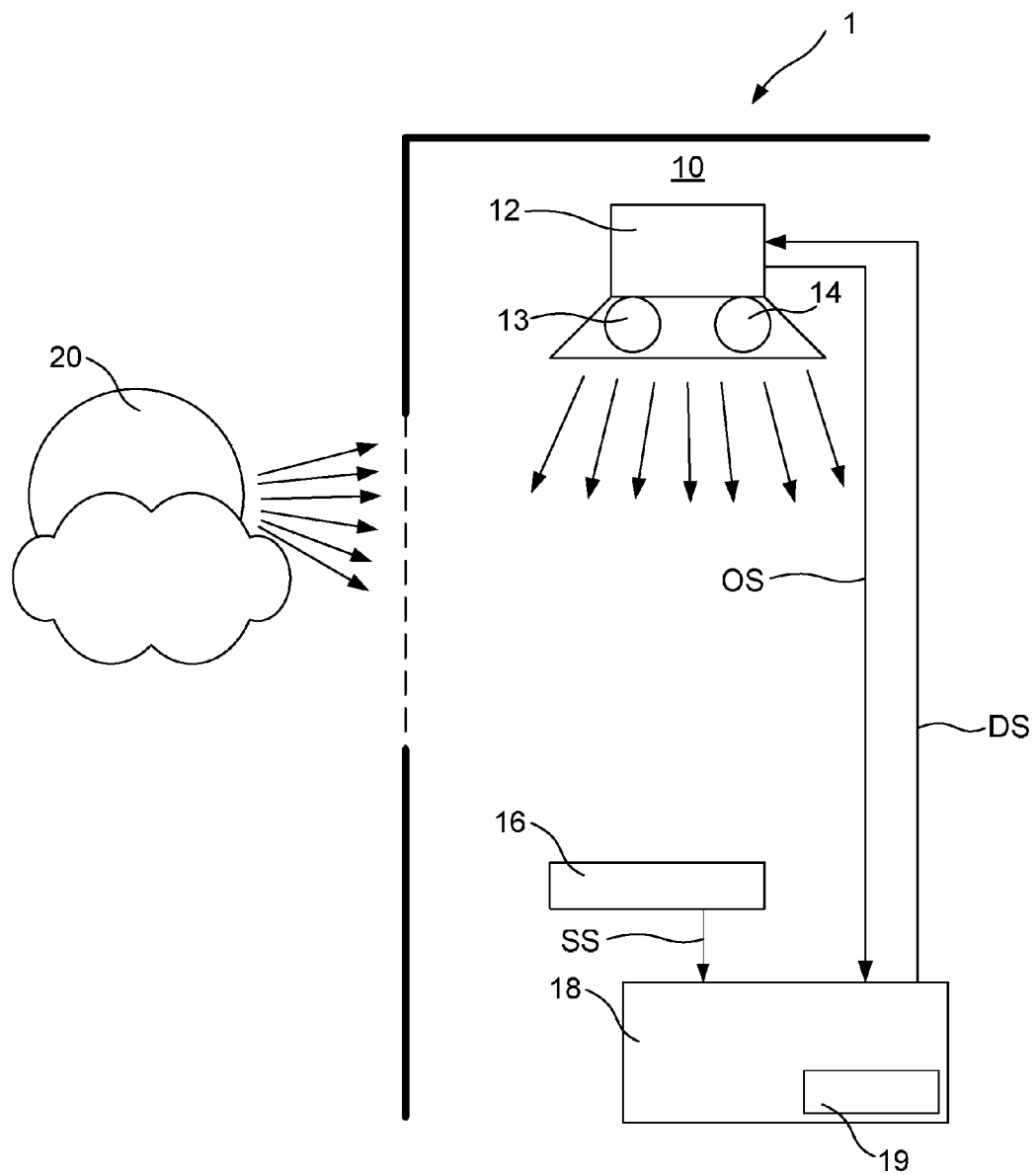
FIG. 1 shows a schematic overview of a lighting system according to the invention.

In FIG. 1 an embodiment of a lighting system 10 according to the present invention is schematically shown. The lighting system 10 is a variable color lighting system. That is, the color of the lighting system 10 may be altered to a desired color temperature. The lighting system 10 is arranged inside a room 1, for example a living room in a house, or for example an office in an office building. The lighting system 10 comprises a light source 12, a light sensor 16 and a controller 18.

The light source 12 is arranged to alter the color of the light emitted by the light source 12 in dependence on a received drive signal DS. The light source 12 comprises first and second light emitters 13, 14. The light emitter 13, 14 are adjustable between a number of light intensity levels. The light emitters may e.g. be light emitting diodes (LEDs), fluorescent tubes or other type of suitable light emitters. The first light emitter 13 is arranged to emit white light having a first color temperature. As a non-limiting example the first color temperature is below 2 000 K. The second light emitter 14 is arranged to emit white light having a second color temperature. As a non-limiting example the first color temperature is above 10 000 K. For simplicity, in the following description the first light emitter will be referred to as a warm light emitter and the second light emitter will be referred to as a cool light emitter. However the person skilled in the art realizes that the first light emitter might instead be a cool light source and the second light emitter might instead be warm light source. By using a warm light emitter having a color temperature below 2 000 K and a cool light emitter having a color temperature above 10 000 K the color temperature in the room 1 may be altered to the maximum possible level. Moreover, the range of possible color temperatures in the room depends on the amount of additional light available (in case of the additional light being daylight the range of possible color temperatures in the room depends on the windows size, time of day, time of year etc.). The light source 12 is further arranged to provide an output signal OS. The output signal OS comprising information pertaining to the current light intensity level of the warm and cool light emitters 13, 14, respectively.

Preferably, the light source 12 comprises a light-mixing element (not shown) to mix the contributions of the different light emitters 13, 14 such that the light emitted by the light source 12 is substantially homogeneous and uniform.

The light sensor 16 is arranged to measure a light intensity and a color temperature of the light impinging on the light sensor 16 and to provide a sense signal SS. The sense signal SS comprising information pertaining to the measured light intensity and color temperature. The light sensor 16 is arranged to continuously measure the light intensity and color temperature of the light in the room 1 at a fixed sampling frequency. The sampling frequency shall be set so that flickering is to be avoided. Normally, the light impinging on the light sensor originates from both the light source 12 and at least one more additional light source 20. As can be seen from the schematic arrangement in FIG. 1, the light impinging on the light sensor 16 is not only light from the light source 12, but also contains contributions of the light emitted by an additional light source 20, in this case the sun 20 (i.e. daylight), which passes through a window of the room 1 and impinges on the light sensor 16. The light sensed by the light sensor 16 may also comprise light which is reflected from any of the walls of the room 1, or reflected from any object inside the room 1. This reflected light typically changes color when the object or wall from which the light has been reflected is not white. This contribution causes the color temperature of the light sensed by the light sensor 16 to be different from the color temperature of the light emitted by the light source 12.

The controller 18 is arranged to control the color temperature and the light intensity of the light in the room 1 by adjusting color temperature of the light source 12. The color temperature of the light source 12 is adjusted by adjusting the light intensity level of the warm and cool light emitters 13, 14, respectively. The light intensity level of the warm and cool light emitters 13, 14, respectively, is set based on the sense signal SS provided by the light sensor and the output signal OS provided by the light source, see below for more details regarding how the. The light intensity levels of the warm and cool light emitters 13, 14, respectively, are controlled. The adjusted light intensity level of the warm and cool light emitters 13, 14, respectively are communicated to the light source 12 via the drive signal DS. Hence the controller 18 is arranged to generate the drive signal DS. The drive signal DS comprising information pertaining to the light intensity level of the warm and cool light emitters 13, 14, respectively.

Preferably, the controller is arranged to alter the drive signal DS such that the color temperature and/or light intensity of the light impinging on the light sensor 16 remains uniform. Referring to FIG. 1, when the sun 20 is partially covered by a cloud 22, the contribution of daylight, which enters through the window, changes, which are sensed by the light sensor 16. The controller 18 receives the present color temperature and light intensity via the sense signal SS of the light sensor 16 and adjusts the color temperature and/or intensity of the light emitted by the light source 12, by controlling the light intensity levels of the warm and cool light emitters 13, 14, respectively, such that the color temperature and/or light intensity of the light impinging on the light sensor 16 remains substantially constant.

After installation the lighting system 10 has to be calibrated, in order to define the correspondence between the light intensity levels of the warm and cool light emitters 13, 14, respectively, and the amount of light intensity measured by the light sensor 16. These correspondences are stored in a memory 19 in the form of a look-up table. The memory 19 is located in the controller 18. It is however realized that the memory may be located elsewhere. The data points of the look-up table can be collected after the installation with an automatic routine implemented on the controller 18. The look-up tables are used to convert light intensity levels to light intensity contribution and vice versa. Thus, the controller 18 is arranged to calibrate the lighting system 10 by defining a correspondence between the number of light intensity levels of the warm and cool light emitters 13, 14, respectively, and a corresponding light intensity measured by the light sensor 16.

Figure 2:
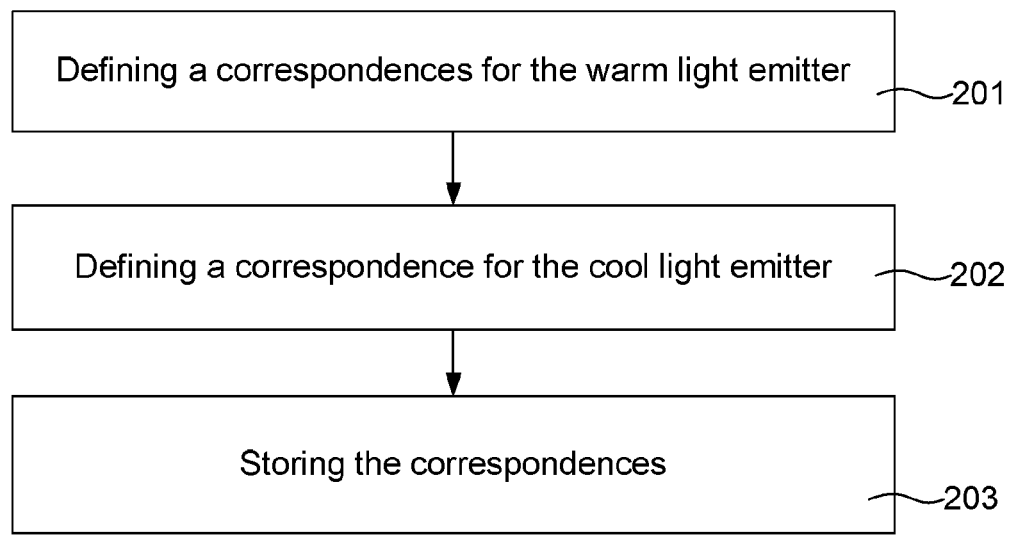
FIG. 2 is a flow chart of a calibration method of the lighting system in FIG. 1.

The calibration of the lighting system 10 is depicted in FIG. 2 and comprises the following steps: Defining, 201, a correspondence between the number of light intensity levels of the warm light emitter 13 and a corresponding light intensity measured by the light sensor 16. Defining, 202, a correspondence between the number of light intensity levels of the cool light emitter and a corresponding light intensity measured by the light sensor 16. Storing, 203, the correspondences in a memory 19.

The sense signal SS, output signal OS and the drive signal DS may be signals which are transmitted via a wire or wirelessly (not indicated). The sense signal SS, output signal OS and the drive signal DS are communicated via a standard protocol (e.g. DALI).

Desired light intensity and color temperature of the light in the room 1 can be set by using a remote control (not shown) which can communicate with the controller (e.g. via infrared communication). The remote control allows the user to choose between a group of preset scenes or to modify the artificial light contribution according to his needs with relative commands (e.g. "Brighter light", "Cooler light" etc.). For the preset scenes, light intensity and color temperature set points are stored in the controller's memory 19. When the relative commands are used, the first measurements of the light intensity and color temperature after the user's action are taken as desired light intensity and color temperature set points.

When the user sets one of the preset scenes, i.e. sets a desired light intensity and color temperature of light in the room 1, the contribution of light intensity and color temperature from the additional light source 20 must be known in order to be able to determine the desired light intensity and color temperature of the light emitters 13, 14 of the light source 12 for the desired light intensity and color temperature of light in the room 1 to be achieved. For the following calculations it is assumed that the CIE 1931 XYZ color space are used. Given that the XYZ chromaticity components of a light emitter are proportional one with each other, the X and Z components can be expressed as the multiplication of the Y component (the Y component being the light intensity) by a constant coefficient, which can be easily computed by the controller with the data collected during the calibration phase. Thus, the contribution of from the at least one more additional light source may be derived according to the following formula:

$$\begin{pmatrix} X_{addlight} \\ Y_{addlight} \\ Z_{addlight} \end{pmatrix} = \begin{pmatrix} X_{measured} \\ Y_{measured} \\ Z_{measured} \end{pmatrix} - \begin{pmatrix} X_{pwarm} \\ Y_{pwarm} \\ Z_{pwarm} \end{pmatrix} - \begin{pmatrix} X_{pcool} \\ Y_{pcool} \\ Z_{pcool} \end{pmatrix} \quad (1)$$

wherein $X_{measured}$, $Y_{measured}$ and $Z_{measured}$ corresponds to presently measured XYZ-values as measured by the sensor 16 and computed by the controller 18, $X_{pwarm}$, $Y_{pwarm}$ and $Z_{pwarm}$ corresponds to the present contribution from the warm light emitter which is know from the calibration of the lighting system for the light intensity levels of the warm light emitter, $X_{pcool}$, $Y_{pcool}$ and $Z_{pcool}$ corresponds to the present contribution from the cool light emitter which is know from the calibration of the lighting system for the light intensity levels of the cool light emitter, and $X_{addlight}$, $Y_{addlight}$ and $Z_{addlight}$ corresponds to the present contribution from the additional light source.

In order to set the desired light intensity and color temperature of light in the room 1 the problem to be solved is to determine new light intensity levels for the warm and cool light emitters 13, 14, respectively, that fulfill the following equation:

$$\begin{pmatrix} X_{setpoint} \\ Y_{setpoint} \\ Z_{setpoint} \end{pmatrix} = \begin{pmatrix} X_{addlight} \\ Y_{addlightt} \\ Z_{addlightt} \end{pmatrix} + \begin{pmatrix} X_{nwarm} \\ Y_{nwarm} \\ Z_{nwarm} \end{pmatrix} + \begin{pmatrix} X_{ncool} \\ Y_{ncool} \\ Z_{ncool} \end{pmatrix} \quad (2)$$

wherein $X_{addlight}$, $Y_{addlight}$ and $Z_{addlight}$ corresponds to the present contribution from the additional light source as determined in accordance with equation (1), $X_{setpoint}$, $Y_{setpoint}$ and $Z_{setpoint}$ corresponds to the desired light intensity and color temperature of light in the room 1, $X_{nwarm}$, $Y_{nwarm}$ and $Z_{nwarm}$ corresponds to the new, to be determined, light intensity contribution from the warm light emitter, and $X_{ncool}$, $Y_{ncool}$ and $Z_{ncool}$ corresponds to the new, to be determined, light intensity contribution from the cool light emitter. At this stage, two conditions, one about desired light intensity (i.e. Y component of the XYZ space) and one about color temperature (via the McCamy's equation) can be written as functions of two variables, that are $Y_{nwarm}$ and $Y_{ncool}$. This leads to three possible solutions (McCamy's equation for colour temperature as function of chromaticity is a third order polynomial) among which the controller is arranged to determine the best solution by considering that the solution has to be a couple of two real positive light intensity levels, $Y_{nwarm}$ and $Y_{ncool}$. Moreover, the new light intensity levels $Y_{nwarm}$ and $Y_{ncool}$ must be achievable with the installed light emitters 13, 14 in order for the solution to be valid.

In case no valid solution is achievable, the controller 18 is arranged to decide which new warm and cool light intensity levels, $Y_{nwarm}$ and $Y_{ncool}$, to set in order to obtain an color temperature that is as close as possible to the desired color temperature by, for example, estimating max/min color temperature achievable irrespective of light intensity out from the light source, estimating max/min color temperature achievable given a tolerance range of light intensity out from the light source, or comparing this estimations with energy considerations. For example, the controller 18 may arrive at that you can achieve your desired intensity and color temperature settings by increasing the global light output (i.e. energy consumption) by 20% and decide whether to implement this or not based on energy consumption policies.

Figure 3:
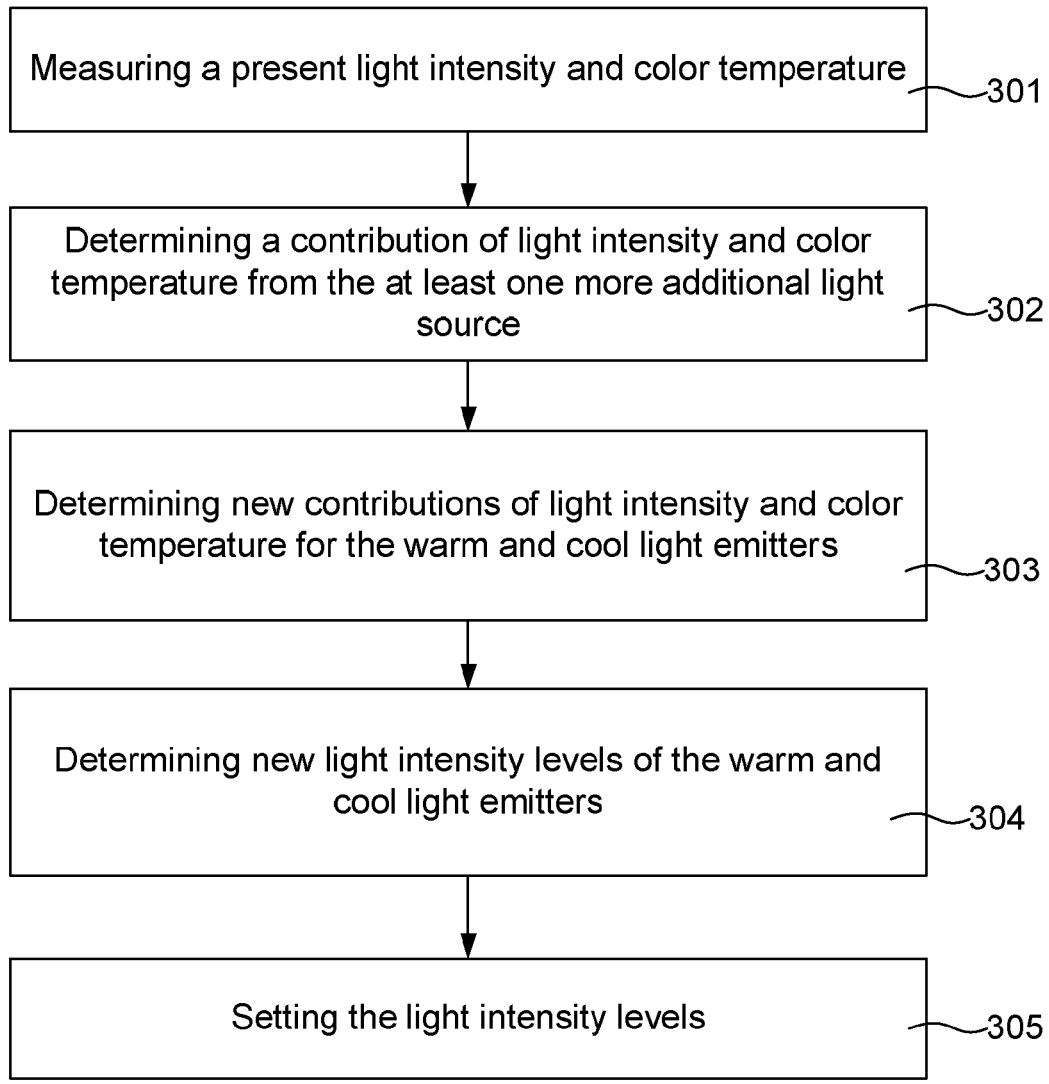
FIG. 3 is a flow chart of a scene setting algorithm of the lighting system in FIG. 1.

Accordingly, the setting of a desired light intensity and color temperature of the light in the room 1 is achieved according to the following, see also FIG. 3: Measuring, 301, a present light intensity and color temperature of light in the room 1. Determining, 302, a contribution of light intensity and color temperature from the at least one more additional light source 20 by subtracting known present contributions of light intensity and color temperature of the warm and cool light emitters 13, 14, respectively, from the measured present light intensity and color temperature. Determining, 303, new contributions of light intensity and color temperature for the warm and cool light emitters 13, 14, respectively, such that the desired light intensity and color temperature of light in the room 1 can be achieved. Determining, 304, based on the correspondences stored in the memory 19, new light intensity levels of the warm and cool light emitters 13, 14 corresponding to said new contributions of light intensity and color temperature. Setting, 305, the light intensity levels of the warm and cool light emitters 13, 14 to said new light intensity levels of the warm and cool light emitters 13, 14.

When the scene is set, either by setting one of the preset scenes or with by relative commands, the controller 18 is arranged to run a feedback control loop for keeping the desired color temperature and light intensity of the light in the room 1 over time. The controller 18 is arranged to run the feedback control loop for keeping the desired color temperature and light intensity over time until the scene is changed by the user of the variable color lighting system 10. The feedback control loop for keeping the desired color temperature and light intensity over time consists of two feedback loops, one for the light intensity and one for the color temperature. Each loop has its own set point, tolerance and tolerance range (i.e. set point±tolerance). The controller 18 is arranged to run the two loops independently. For both the light intensity feedback loop and the color temperature feedback loop the following strategy is used:
1. Measure the parameter of interest (light intensity or color temperature).
2. Compare the measurement with the set point.

3. If the measurement is within the tolerance range, go to step 1.
4. Else change light intensity levels of the warm and cool light emitters 13, 14.
5. Go to step 1.

The light intensity levels of the warm and cool light emitters 13, 14 are changed differently for the two feedback loops.

For the light intensity feedback loop, the light intensity levels of the warm and cool light emitters 13, 14 are modified by adjusting the light intensity level of both the warm and cool light emitters 13, 14 such that the light intensity of light in the room corresponds to the set light intensity.

Figure 4:
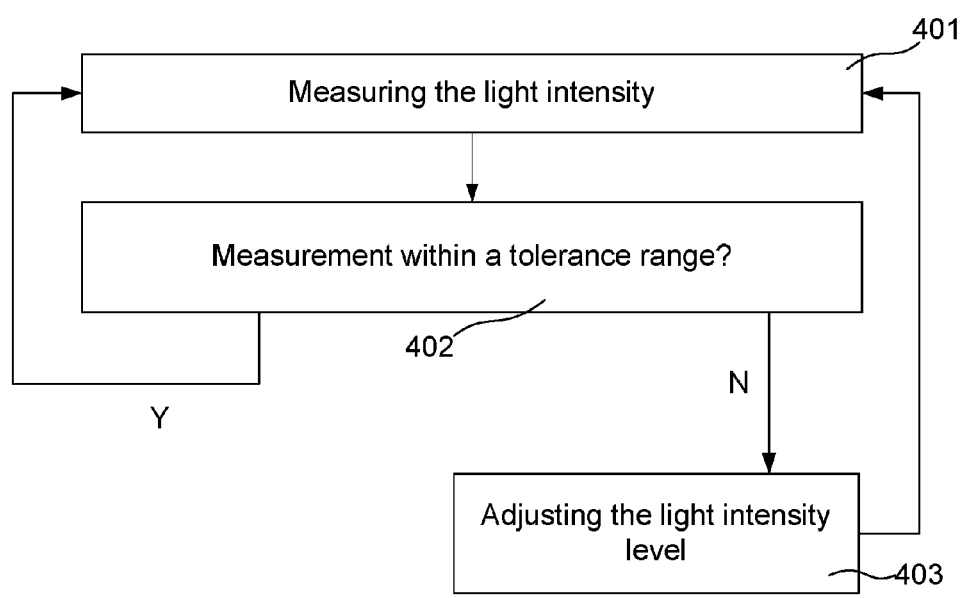
FIG. 4 is a flow chart of a light intensity feedback loop of the lighting system in FIG. 1.

Accordingly, the controlling of the light intensity of the light in the room 1 is achieved according to the following, see also FIG. 4: Measuring, 401, the light intensity of light in the room. Comparing, 402, the measured light intensity with a predetermined light intensity. Adjusting, 403, in case of the measured light intensity being below or above the predetermined light intensity, the light intensity level of both the first and second light emitters 13, 14 such that the light intensity of light in the room corresponds to the predetermined light intensity.

For the color temperature feedback loop, the light intensity levels of the warm and cool light emitters 13, 14 are modified according to any one of the following strategies:

1a. If the color temperature is too high increase the light intensity level of the warm light emitter 13 with a predetermined amount.
2a. Determine the corresponding light intensity increase ($\Delta LI$) via the look-up tables stored in the memory 19.
3a. Compute the new cool light intensity by subtracting $\Delta LI$ from the present light intensity.
4a. Determine the new light intensity level of the cool light emitter 14 via the look-up tables stored in the memory 19.
5a. Set the light intensity level of cool light emitter 14 to the light intensity level determined in step 4a.
6a. Go to step 1.

1b. If the color temperature is too low increase the light intensity level of the cool light emitter 14 with a predetermined amount.
2b Determine the corresponding light intensity increase ($\Delta LI$) via the look-up tables stored in the memory 19.
3b. Compute the new warm light intensity by subtracting $\Delta LI$ from the present light intensity.
4b. Determine the new light intensity level of the warm light emitter 13 via the look-up tables stored in the memory 19.
5b. Set the light intensity level of warm light emitter 13 to the light intensity level determined in step 4b.
6b. Go to step 1.

1c. If the color temperature is too high decrease the light intensity level of the cool light emitter 14 with a predetermined amount.
2c. Determine the corresponding light intensity decrease ($\Delta LI$) via the look-up tables stored in the memory 19.
3c. Compute the new warm light intensity by adding $\Delta LI$ to the present light intensity.
4c. Determine the new light intensity level of the warm light emitter 13 via the look-up tables stored in the memory 19.
5c. Set the light intensity level of warm light emitter 13 to the light intensity level determined in step 4c.
6c. Go to step 1.

1d. If the color temperature is too low decrease the light intensity level of the warm light emitter 13 with a predetermined amount.
2d. Determine the corresponding light intensity decrease ($\Delta LI$) via the look-up tables stored in the memory 19.
3d. Compute the new cool light intensity by adding $\Delta LI$ to the present light intensity.
4d. Determine the new light intensity level of the cool light emitter 14 via the look-up tables stored in the memory 19.
5d. Set the light intensity level of cool light emitter 14 to the light intensity level determined in step 5c.
6d. Go to step 1.

Any one of the above strategies for the color temperature feedback loop changes the color temperature and preserves the total amount of artificial light used in the room 1; therefore it does not affect the total light intensity. Thus, the color temperature feedback loop and the light intensity feedback loop are therefore independent of each other.

Figure 5A:
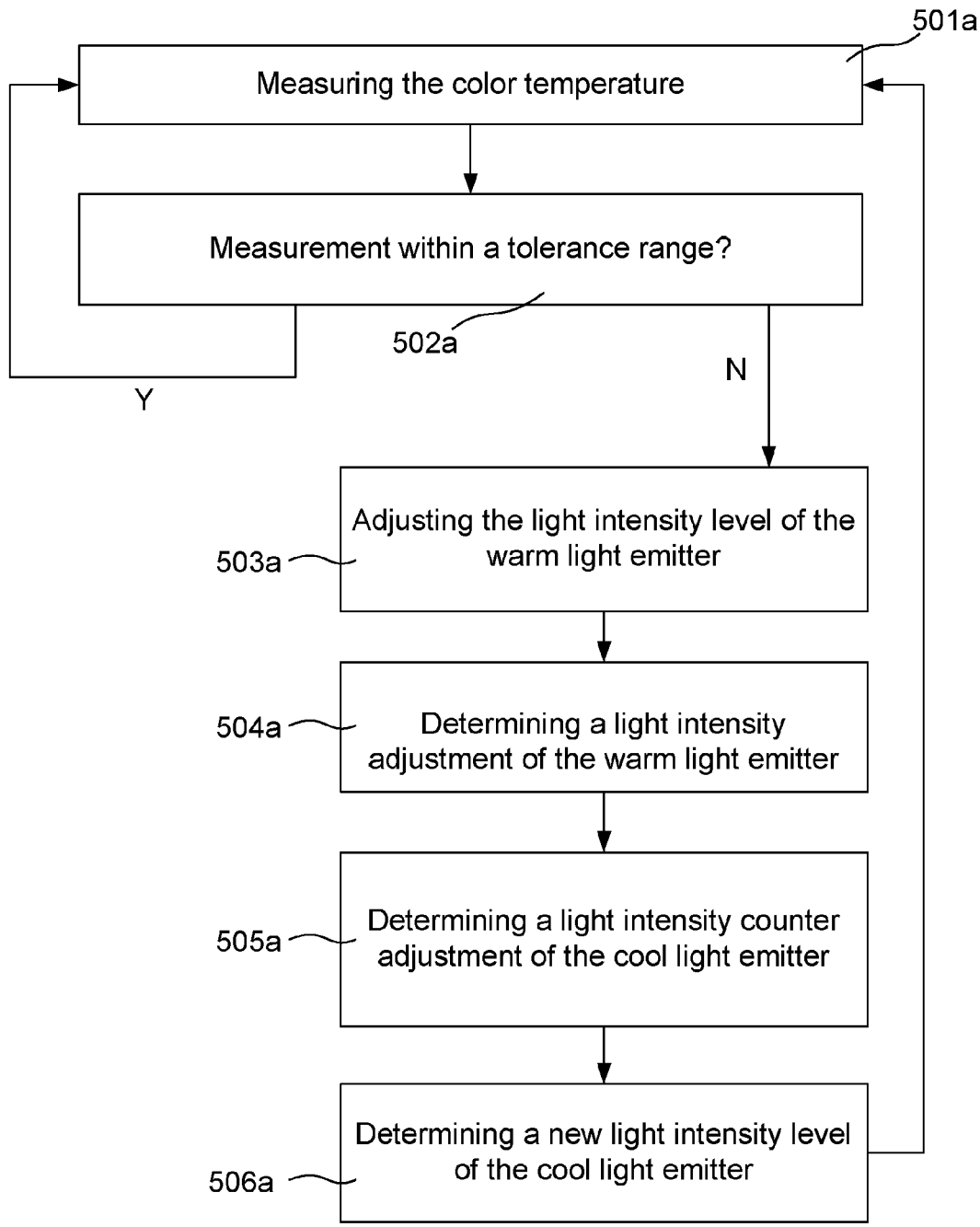
FIG. 5a is a flow chart of a color temperature feedback loop of the lighting system in FIG. 1.
Figure 5B:
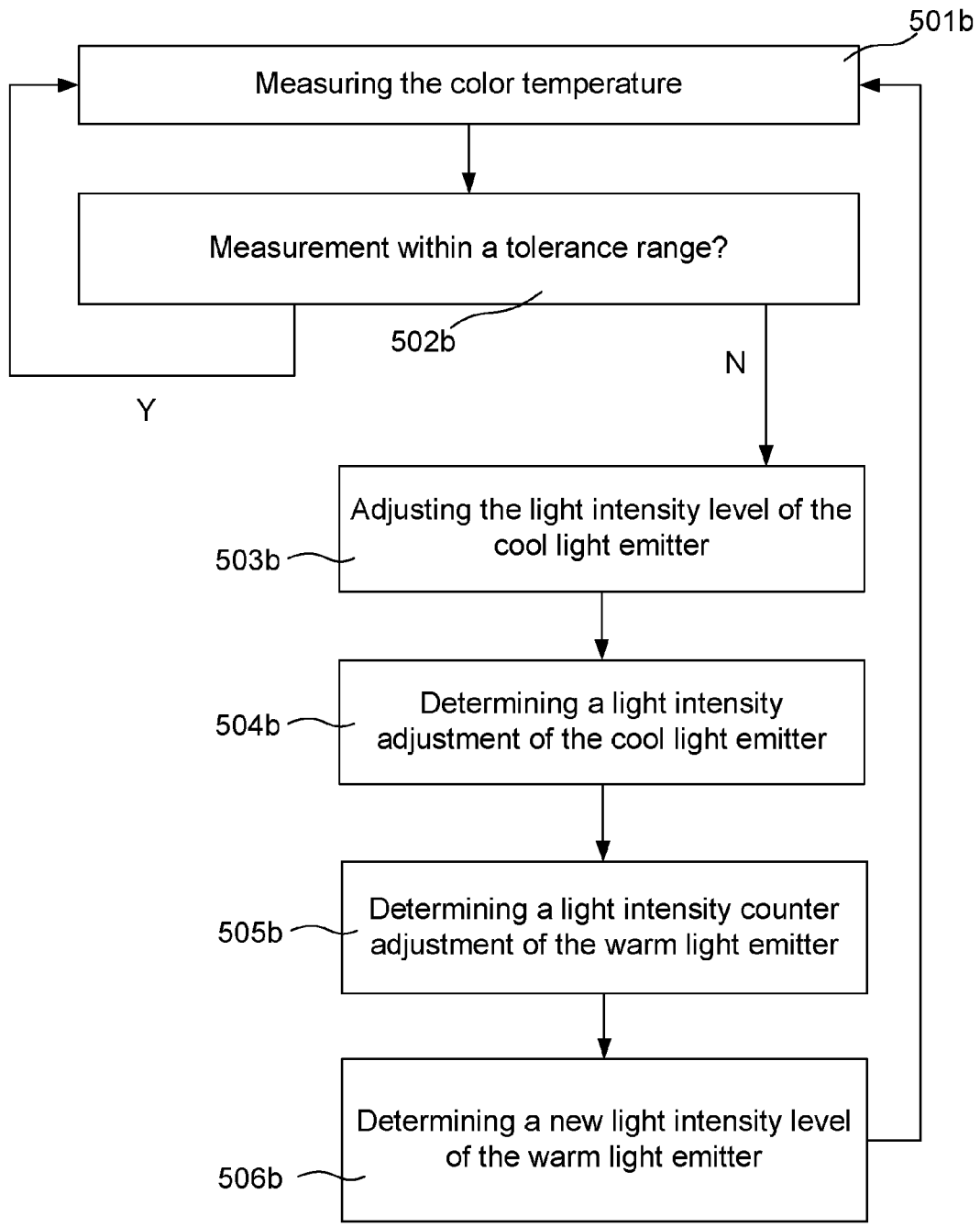
FIG. 5b is a flow chart of an alternative color temperature feedback loop of the lighting system in FIG. 1.

Accordingly, the controlling of a color temperature of the light in the room 1 is achieved according to the following, see FIGS. 5a and 5b: Measuring, 501a, 501b, the color temperature of light in the room 1. Comparing, 502a, 502b, the measured color temperature with a predetermined color temperature. Adjusting, 503a, 503b, in case of the measured color temperature being below or above the predetermined color temperature, the light intensity level of the warm light emitter 13 (alternatively of the cool light emitter 14) with a predetermined amount. Determining, 504a, 504b, based on the correspondences stored in the memory 19, a light intensity adjustment of the warm light emitter 13 (alternatively of the cool light emitter 14) corresponding to said adjusting of the light intensity level. Determining, 505a, 505b, a light intensity counter adjustment of the cool light emitter 14 (alternatively of the warm light emitter 13) such that the light intensity of the light source 12 is preserved. Determining, 506a, 506b, based on the correspondences stored in the memory 19, a new light intensity level of the cool light emitter 14 (alternatively of the warm light emitter 13) corresponding to said light intensity counter adjustment.

In this document a lighting system 10 that provides the desired light outcome in terms of both light intensity and color temperature, independent of the amount of additional light, e.g. daylight, in the room 1 is disclosed. The lighting system 10 sets the light intensity levels of different light emitters 13, 14 in order to compensate for the contribution from the additional light source not only as far as color temperature, but also as far as light intensity is concerned. Moreover, the lighting system 10 acts to minimize the deviations of the color temperature from the value set by the user under different additional light conditions. Thus, the lighting ambience set by the user will be kept constant independent of the variations of the additional light in the room. Moreover, when the amount of additional light in the room does not allow the lighting system 10 to meet the settings of the user, the lighting system 10 itself can decide how to optimize the artificial lighting so as to deliver an ambience as close as possible to the user's desire. The result is energy saving from daylight harvesting combined with enhanced customer satisfaction attained by keeping color temperature constant.

The person skilled in the art realizes that the present invention by no means is limited to the preferred embodiments described above. On the contrary, many modifications and variations are possible within the scope of the appended claims. For example, the sensor 16 may be embedded in the controller 18.

According to another alternative embodiment the controller 18 may be comprised in the light source 12.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measured cannot be used to advantage.

The invention claimed is:

1. Lighting system arranged to control a light intensity and a color temperature of light in a room, the lighting system comprising:
  a light source arranged to emit light, the light source comprising a first light emitter adjustable between a number of light intensity levels and arranged to emit light having a first color temperature, and a second light emitter adjustable between a number of light intensity levels and arranged to emit light having a second color temperature, wherein said second color temperature is different from said first color temperature, the light source is further arranged to provide an output signal comprising information pertaining to a light intensity level of said first and second light emitters, respectively;
  a light sensor arranged to measure the light intensity and the color temperature of the light in the room, the light in the room originating from both the light source and at least one more additional light source, and to provide a sense signal comprising information pertaining to the measured light intensity and color temperature; and
  a controller arranged to control the color temperature and the light intensity of the light in the room by adjusting the light intensity level of said first and second light emitters, based on said sense signal provided by the light sensor and said output signal provided by the light source;
  wherein the controller is further arranged to calibrate the lighting system by defining a correspondence between a number of light intensity levels of the first light emitter and a corresponding light intensity measured by the light sensor and a correspondence between a number of light intensity levels of the second light emitter and a corresponding light intensity measured by the light sensor, and to store these correspondences in a memory
  wherein the controller is further arranged to set a desired light intensity and color temperature of the light in the room by: from the sensor receiving measured present light intensity and color temperature of light in the room; determining a contribution of light intensity and color temperature from the at least one more additional light source by subtracting a present contribution of light intensity and color temperature of the first and second light emitters, respectively, from the measured present light intensity and color temperature; determining new contributions of light intensity and color temperature for the first and second light emitters, respectively, such that the desired light intensity and color temperature of light in the room can be achieved; determining, based on the correspondences stored in the memory, new light intensity levels of the first and second light emitters corresponding to said new contributions of light intensity and color temperature; and setting the light intensity levels of the first and second light emitters to said new light intensity levels of the first and second light emitters.

2. Lighting system according to claim 1, wherein the first and second light emitters are arranged to emit white light.

3. Lighting system according to claim 1, wherein the first color temperature is below 2 000 K and the second color temperature is above 10 000 K.

4. Lighting system according to claim 1, wherein the light sensor is arranged to continuously measure the light intensity and the color temperature at a fixed sampling frequency.

5. Lighting system according to claim 4, wherein the fixed sampling frequency is equal to or more than 0.1 Hz.

6. Method for controlling a light intensity and color temperature of light in a room, the method comprising:
  providing a lighting system comprising: a light source arranged to emit light, the light source comprising a first light emitter adjustable between a number of light intensity levels and arranged to emit light having a first color temperature, and a second light emitter adjustable between a number of light intensity levels and arranged to emit light having a second color temperature, wherein said second color temperature is different from said first color temperature; and a light sensor arranged to measure a light intensity and a color temperature;
  outputting, from the light source, an output signal comprising information pertaining to a light intensity level of said first and second light emitters, respectively;
  outputting, from the light sensor, a sense signal comprising information pertaining to the measured light intensity and color temperature;
  calibrating the lighting system by defining a correspondence between a number of light intensity levels of the first light emitter and a corresponding light intensity measured by the light sensor and a correspondence between a number of light intensity levels of the second light emitter and a corresponding light intensity measured by the light sensor and storing said correspondences in a memory; and
  controlling the light intensity and color temperature of the light in the room, the light in the room originating from both the light source and at least one more additional light source, by adjusting the light intensity level of said first and second light emitters, based on said sense signal provided by the light sensor and said output signal provided by the light source,
  wherein the method further comprises:
    setting a desired light intensity and color temperature of light in the room, the light in the room originating from both the provided light source and at least one more additional light source, by:
    measuring a present light intensity and color temperature of light in the room;
    determining a contribution of light intensity and color temperature from the at least one more additional light source by subtracting a, from the calibrating act, known present contributions of light intensity and color temperature of the first and second light emitters, respectively, from the measured present light intensity and color temperature;
    determining new contributions of light intensity and color temperature for the first and second light emitters, respectively, such that the desired light intensity and color temperature of light in the room can be achieved;
    determining, based on the correspondences stored in the memory, new light intensity levels of the first and second light emitters corresponding to said new contributions of light intensity and color temperature; and
    setting the light intensity levels of the first and second light emitters to said new light intensity levels of the first and second light emitters.

7. Method according to claim 6, wherein the first and second light emitters are arranged to emit white light.

8. Method according to claim 6, wherein the first color temperature is below 2 000 K and the second color temperature is above 10 000 K.

9. Method according to claim 6, wherein said at least one more additional light source comprises daylight.

* * * * *